(12) United States Patent
Miyano

(10) Patent No.: US 7,088,461 B2
(45) Date of Patent: Aug. 8, 2006

(54) PRINTER FOR PRINTING IN CONJUNCTION WITH A SERVER

(75) Inventor: Tsuyoshi Miyano, San Jose, CA (US)

(73) Assignee: Alps Electric Co., Ltd., Tokyo (JP)

( * ) Notice: Subject to any disclaimer, the term of this patent is extended or adjusted under 35 U.S.C. 154(b) by 955 days.

(21) Appl. No.: 09/898,684

(22) Filed: Jul. 2, 2001

(65) Prior Publication Data

US 2003/0002066 A1    Jan. 2, 2003

(51) Int. Cl.
*G06F 15/00* (2006.01)
(52) U.S. Cl. ............... 358/1.14; 358/1.1; 358/1.13; 358/1.15; 358/1.16; 709/208
(58) Field of Classification Search .............. 358/1.13, 358/1.14, 1.15, 1.16, 1.1; 709/208; 382/250
See application file for complete search history.

(56) References Cited

U.S. PATENT DOCUMENTS

| | | | |
|---|---|---|---|
| 6,163,383 A * | 12/2000 | Ota et al. ................. 358/1.1 |
| 6,292,267 B1 * | 9/2001 | Mori et al. ............... 358/1.15 |
| 6,313,921 B1 * | 11/2001 | Kadowaki ................ 358/1.15 |
| 6,545,767 B1 * | 4/2003 | Kuroyanagi ............. 358/1.14 |
| 6,608,696 B1 * | 8/2003 | Iimoto et al. ............ 358/1.15 |
| 6,636,891 B1 * | 10/2003 | LeClair et al. ........... 709/208 |
| 6,707,570 B1 * | 3/2004 | Gotanda et al. ......... 358/1.15 |
| 6,795,208 B1 * | 9/2004 | Tanaka .................... 358/1.16 |
| 6,839,468 B1 * | 1/2005 | Mitchell et al. ......... 382/250 |
| 2002/0033959 A1 * | 3/2002 | Ando et al. .............. 358/1.13 |
| 2002/0078160 A1 * | 6/2002 | Kemp et al. ............. 709/208 |
| 2002/0097419 A1 * | 7/2002 | Chang et al. ............ 358/1.13 |
| 2002/0105670 A1 * | 8/2002 | Maruyama ............... 358/1.14 |

* cited by examiner

*Primary Examiner*—Kimberly Williams
*Assistant Examiner*—Satwant Singh
(74) *Attorney, Agent, or Firm*—Beyer, Weaver & Thomas LLP.

(57) ABSTRACT

A printer suitable for use in conjunction with a server operable to output rendered data representing an image to the printer via a network is described. The printer includes a storage medium operable to store identification data associated with the printer, and a controller. The controller is operable to send the identification data to the server, receive decoding data and the rendered data from the server, and generate decoded data by decoding the rendered data by using the decoding data. The printer further includes a printer mechanism operable to print the image based on the decoded data.

29 Claims, 4 Drawing Sheets

PRINTER FOR PRINTING IN CONJUNCTION WITH A SERVER

RELATED APPLICATION DATA

The present application is related to U.S. patent application Ser. No. 09/898,875, for "PRINTER CAPABLE OF INVALIDATING A DOCUMENT" (Miyano) filed concurrently herewith and assigned to the assignee of the present invention, which is incorporated herein by reference for all purposes.

BACKGROUND OF THE INVENTION

The present invention relates to a printer for printing a document, and more specifically, to apparatus and methods for communicating with a server.

Printers, for example, thermal transfer printers, are used for printing various documents with high resolution and full colors (e.g., 8 bits for each of CMYK). The printing quality of the printers has been improved to the extent that documents printed by these printers are used as documents of value, e.g., original tickets, gift certificates, postage stamps, and the like. At the same time, prices for these high-quality printers have been substantially reduced.

In a situation where a user prints out an original valuable document based on printing data retrieved from a remote host (e.g., a content provider's server), the current network/printing systems pose a serious problem: that is, counterfeiting by an authorized user using an unauthenticated printer. In other words, the current systems have risks where an authorized user may intercept image data of the document of value from the server, forge the image, and print a counterfeit document.

In view of these and other issues, it would be highly desirable to have a technique allowing a remote server to authenticate a printer which is used for printing a document of value.

SUMMARY OF THE INVENTION

According to various embodiments of the present invention, a printer receives rendered image data from a server via a network. In one specific embodiment, the rendered image data is encoded by the server using encoding data. The encoded rendered image data is decoded by the printer using decoding data. Here, the encoding data and the decoding data are a complementary pair of an data encryption scheme.

One aspect of the present invention provides a printer suitable for use in conjunction with a server operable to output rendered data representing an image to the printer via a network. The printer includes a storage medium and a controller. The controller is operable to send the identification data to the server, receive decoding data and the rendered data from the server, and generate decoded data by decoding the rendered data by using the decoding data. The storage medium is operable to operable to store identification data associated with the printer. The printer further includes a printer mechanism operable to print the image based on the decoded data.

Another aspect of the present invention provides a method for printing an image by a printer based on rendered data received from a server operable to output the rendered data representing the image to the printer. According to the method, the printer first retrieves identification data associated with the printer, and sends the identification data to the server. Then, the printer receives decoding data and the rendered data from the server, and generates decoded data by decoding the rendered data by using the decoding data. Finally, the printer prints the image based on the decoded data.

Still another aspect of the present invention provides a server suitable for use in conjunction with a printer operable to print rendered data representing an image. The server includes a printer driver and a controller. The printer driver is operable to generate the rendered data. The controller is operable to receive identification data associated with the printer from the printer, and authenticate the printer based on the identification data. After the authentication, the controller sends decoding data suitable for use by the printer to decode the rendered data, and sends the rendered data to the printer.

Still another aspect of the present invention provides a method for communicating with a printer operable to print rendered data representing an image. According to the method, the server first generates the rendered data. Then, the server receives identification data associated with the printer from the printer, and authenticates the printer based on the identification data. After the authentication, the server sends decoding data suitable for use by the printer to decode the rendered data, and sends the rendered data to the printer.

A further understanding of the nature and advantages of the present invention may be realized by reference to the remaining portions of the specification and the drawings.

DETAILED DESCRIPTION OF SPECIFIC EMBODIMENTS

Various embodiments of the present invention will now be described in detail with reference to the drawings, wherein like elements are referred to with like reference labels throughout.

Figure 1:
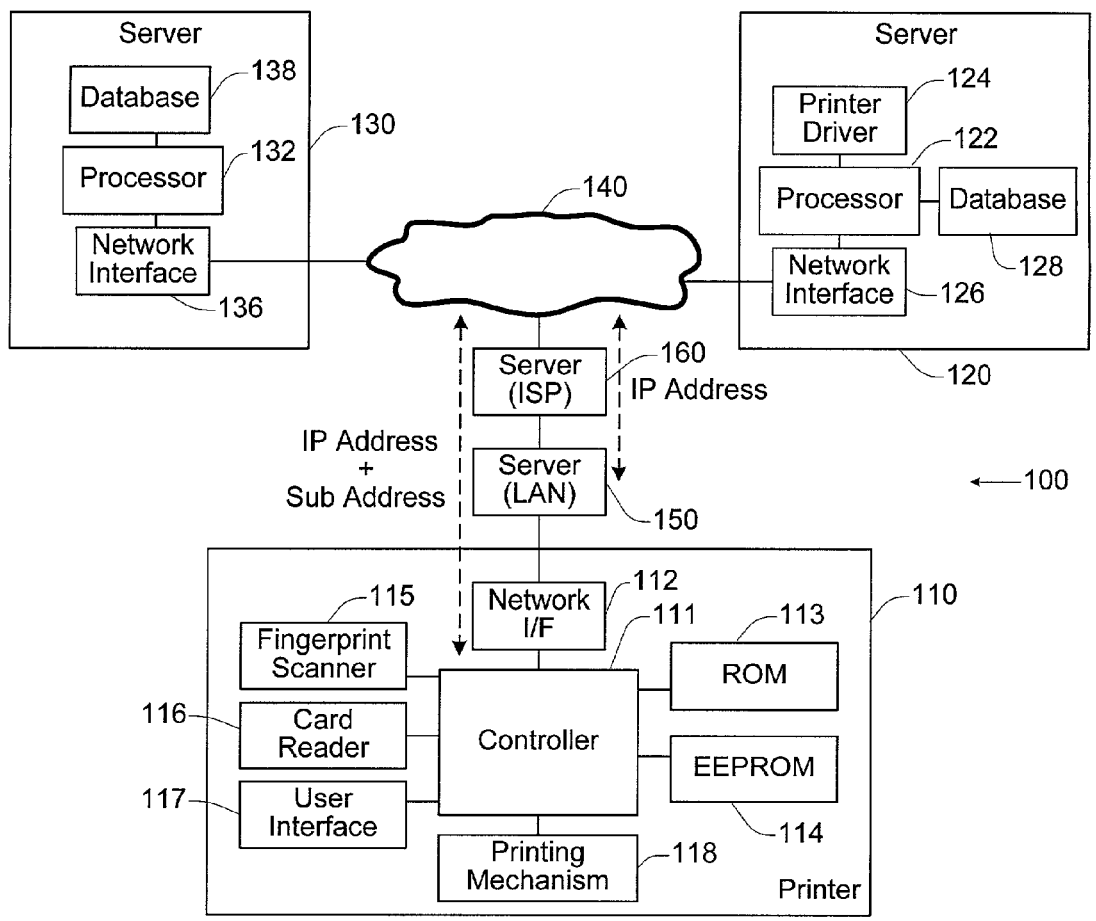
FIG. 1 is a block diagram of a system including a printer coupled to a remote server according to a specific embodiment of the present invention.

FIG. 1 is a block diagram of a system including a printer coupled to a remote server according to a specific embodiment of the present invention. The system 100 includes a printer 110, a content server 120, and a billing server 130, each of which is directly or indirectly connected to a suitable network 140 including any combination of the Internet and/or other various networks as described in detail later. The printer 110 is connected to the network 140 through a LAN server 150 for managing a LAN (Local Area Network) and an ISP server 160 managed by an ISP (Internet Service Provider). The printer 110 communicates with the content server 120 in order to retrieve image data from the content server 120 for issuing a document (e.g., checks, tickets, gift certificates, postage stamps, and the like), which typically has value.

A user using the printer 110 and the LAN server 150 accesses the content server 120, which is maintained by, for example, a content provider. When the user wants to phase, for example, a concert ticket from the content provider, and have the printer 110 print out the original concert ticket, the content server 120 sends necessary image data for issuing the ticket by the printer 110 through the network 140, the ISP server 160 and the LAN server 150. The image data output by the content server 120 has been already rendered (or rasterized) by a processor 122 using a printer driver software 124 for the printer 110. The rendered image data is then encoded by the processor 122 using a suitable encoding algorithm, and output through a network interface 126 to the printer 110. For simplicity, in this specification, a printer which is allowed to print documents of value (e.g., negotiable instruments, tickets, various certificates, checks, postage stamps, and the like) is referred to as a "printer for valuable documents."

In other words, the server 120 includes a printer driver 124 which is capable of rendering image data for a document of value. Intervening servers (not shown) on the network and the local server 150 directly connected to the printer 10 for valuable documents do not render or rasterize the image data. In other words, the rendered image data generated by the server 120 is not rendered or rasterized while being transmitted to the printer 110 through servers on the network, thereby avoiding any alterations or modifications to the original rendered image data.

The printer 110 includes a controller 111, a network interface 112, a ROM (Read-Only Memory) 113, an EEPROM (Electrically Erasable Programmable Read-Only Memory) 114, a fingerprint scanner 115, a card reader 116, a user interface 117 and a printing mechanism 118. The controller 111 controls various functions of components included in the printer 110, communicates with an external device by exchanging data through the network interface 112, and processes the retrieved data. The controller 111 is typically implemented by a microprocessor unit.

The network interface 112 connects the controller 111 to the LAN server 150 using, for example, the Ethernet protocol. The LAN server 150 communicates with the ISP server 160 using TCP/IP (Transport Control Protocol/Internet Protocol). The ISP server 160 communicates with the content server 120 using TCP/IP. The network connection between the network interface 112 and the servers 150 and 160 includes wired and/or wireless connections. It should be understood that the printer 110 and the content server 120 may be communicated through one or more network devices including PCs (Personal Computers), servers, routers, Internet appliances, terminal adapters, and the like.

In a specific embodiment, the ROM 113 stores various parameters or data associated with the printer 110 and/or controller 111. The identification data associated with the printer 110 includes at least one of (i) data representing a printer for valuable documents (e.g., manufacturer's name and model number of the printer 110) and (ii) information uniquely assigned to the printer 110 (e.g., a serial number of the printer 110). The EEPROM 114 may store at least one of (i) an IP address of the printer 110 and (ii) the information unique to the printer 110 including an identification number issued by an organization which controls use of printers for valuable documents. The EEPROM 114 may further store data representing a decoding table, an encoding table, and an activate code received from the content server 120 as described later. Various embodiments of the present invention may use other types of a suitable storage medium which serves as the EEPROM 114, including a ROM (read only memory), a RAM (random access memory), a hard disk drive, and other magnetic, optical or magneto-optical data storage devices.

The fingerprint scanner 115 includes a transparent platen for flat impressions of fingerprints, against which a fingertip of the user is pressed, and an optical scanning unit for generating user data corresponding to the user's fingerprint. The card reader 116 includes a data input unit which retrieves user data stored in a card inserted by the user. For example, the card is a credit card, and the user data represents credit card information of the user. The data input unit includes one of (i) a magnetic head which scans on a magnetic stripe of the card, and (ii) a set of contact pads for electrically connecting to corresponding contact pads provided on the card. The data input unit may be modified depending on the type of the user's card. Although the specific embodiment of the present invention includes the fingerprint scanner 115 and the card reader 116 which is operable to generate user data unique to the user for authentication by the content server 120, it should be understood that one of these may be omitted.

The user interface 117 includes any suitable display for presenting information to the user and/or input device for receiving the user's responses. The suitable display includes, for example, an LED (Light Emitting Diode), an LCD (Liquid Crystal Display) panel, and a touch panel using an LCD. The suitable input device includes, for example, a switch, a potentiometer, and a touch panel using an LCD. The user interface 117 receives information to be output to the user from the controller 111, and sends information input from the user to the controller 111.

The printing mechanism 118 may be any suitable printing mechanism including a thermal transfer printing mechanism, an ink jet printing mechanism, an electrophotographic printing (i.e., "laser printing") mechanism, and the like. Typically, the printing mechanism 118 prints an image for the document of value requested by the user on a print medium, such as paper. Typically, the printing mechanism 118 prints an image for the document of value requested by the user on a print medium including paper, plastic material, thin metal material, and the like. The printing mechanism 118 may utilize a monochrome printing scheme, and other printing methods using special links including UV (Ultraviolet) inks and/or magnetic inks in addition to the full-color printing scheme.

The LAN server 150 communicates with the printer 110 by, for example, the Ethernet protocol. The LAN server 150 may be connected to other external devices, such as a PC (personal computer), a printer server, a router, and the like. The connection between the printer 110 and the LAN server 150 may be combination of wired and/or wireless coupling using various data transmission medium such as twisted pair cables, baseband coaxial cables, broadband coaxial cables, optical fibers, radio frequency waves, infrared waves, and the like.

The ISP server 160, which is provided by, for example, an ISP, communicates with the LAN server 150 and the network 140 typically by the TCP/IP protocol. The content server 120 provided by a content provider also communicates with the network 140 typically by the TCP/IP protocol.

The network 140 may be any combination of networks including the Internet, a LAN, a MAN (Metropolitan Area Network), a WAN (Wide Area Network), a global area network, and any number of private networks currently referred to as an Intranet. Such a combination of networks may be implemented with any number of hardware and software components, transmission media and network protocols.

When the printer 110, which has been hypothetically authenticated already for purposes of explanation, sends a request for issuing a document to the content server 120, the content server 120 first checks an activate code sent by the printer 110. The processor 122 of the content server 120 looks up into a database 128 which contains a list of activate codes corresponding to users having valid accounts for certain services. For example, when a user requests for issuance of a concert ticket, the user must have a valid account for the ticket issuing services of the content-provider. If the content server 120 confirms that the user has a valid activate code by matching the user's activate code with those stored in the database 128, then the processor 122 performs rendering (or rasterizing) of an image to be appeared on the document requested from image data stored in the database 128. The processor 122 then encodes the rendered image data by using an encoding table, and sends the encoded rendered image data to the printer 110 via the network 140, the ISP server 160, and the LAN server 150.

When the transaction of issuing the document (here, the concert ticket) finishes normally, the content server 120 communicates with the billing server 130 provided by, for example, a credit card company for billing purposes. The billing server 130 also communicates with the content server 120 via the network 140. The billing server 130 includes a processor 132, a network interface 136, and a database 138. The processor 132 receives information about the user's billing from the content server 120, and performs a billing process using the database 138.

Figure 2:
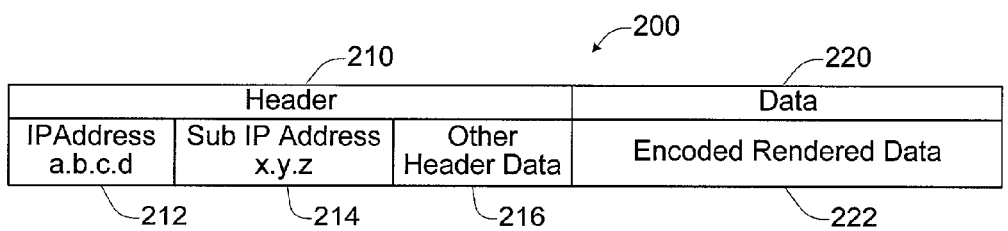
FIG. 2 is a diagram of a data packet used for a specific embodiment of the present invention.

FIG. 2 is a diagram of a data packet used for a specific embodiment of the present invention. According to the specific embodiment of the present invention, a data packet 200 of the encoded rendered image data sent from the content server 120 to the printer 110 includes a header portion 210 and a data portion 220. The header portion 210 includes an IP address 212, a sub IP address 214, and other header data 216. The data portion 220 includes encoded rendered image data 222, which is all or part of the encoded rendered image data generated by the processor 122 using the printer driver 124. In this embodiment, the IP address 212 (namely, four octets of "a.b.c.d") specifies the LAN server 150, and combination of the IP address 212 (a.b.c.d) and the sub IP address 214 (namely, three octets of "x.y.z") specifies the printer 110.

When the LAN server 150 receives a data packet containing the IP address 212 (a.b.c.d) corresponding to the LAN server 150, the LAN server 150 looks into the header portion 210 to check whether the header portion 210 includes the sub IP address (x.y.z) corresponding to the printer 110. If the header 210 has the sub IP address (x.y.z), then the LAN server 150 passes the data packet 200 to the printer 110 without parsing the data packet 200 further. The LAN server 150 assigns a unique sub IP address corresponding to the printer 110 in order to specify a destination printer for an incoming data packet.

Figure 3:
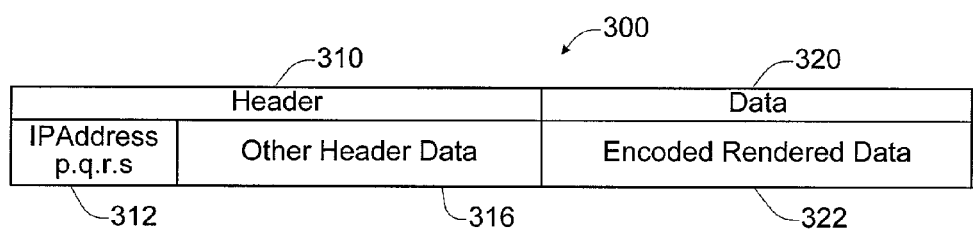
FIG. 3 is a diagram of a data packet used for another specific embodiment of the present invention.

FIG. 3 is a diagram of a data packet used for another specific embodiment of the present invention. According to this specific embodiment of the present invention, a data packet 300 of the encoded rendered image data sent from the content server 120 to the printer 110 includes a header portion 310 and a data portion 320. The header portion 310 includes an address 312 and other header data 316. The data portion 320 includes encoded rendered image data 322, which is all or part of the encoded rendered image data generated by the processor 122 using the printer driver 124. In this embodiment, the IP address 312 (namely, four octets of "p.q.r.s") specifies the printer 110.

When the LAN server 150 receives a data packet containing the IP address 312 (p.q.r.s) corresponding to the printer 110, the LAN server 150 passes the data packet 300 to the printer 110 without parsing the data packet 300. A system administrator can assign a unique IP address corresponding to the printer 110 in order to specify a destination printer for an incoming data packet.

Figure 4:
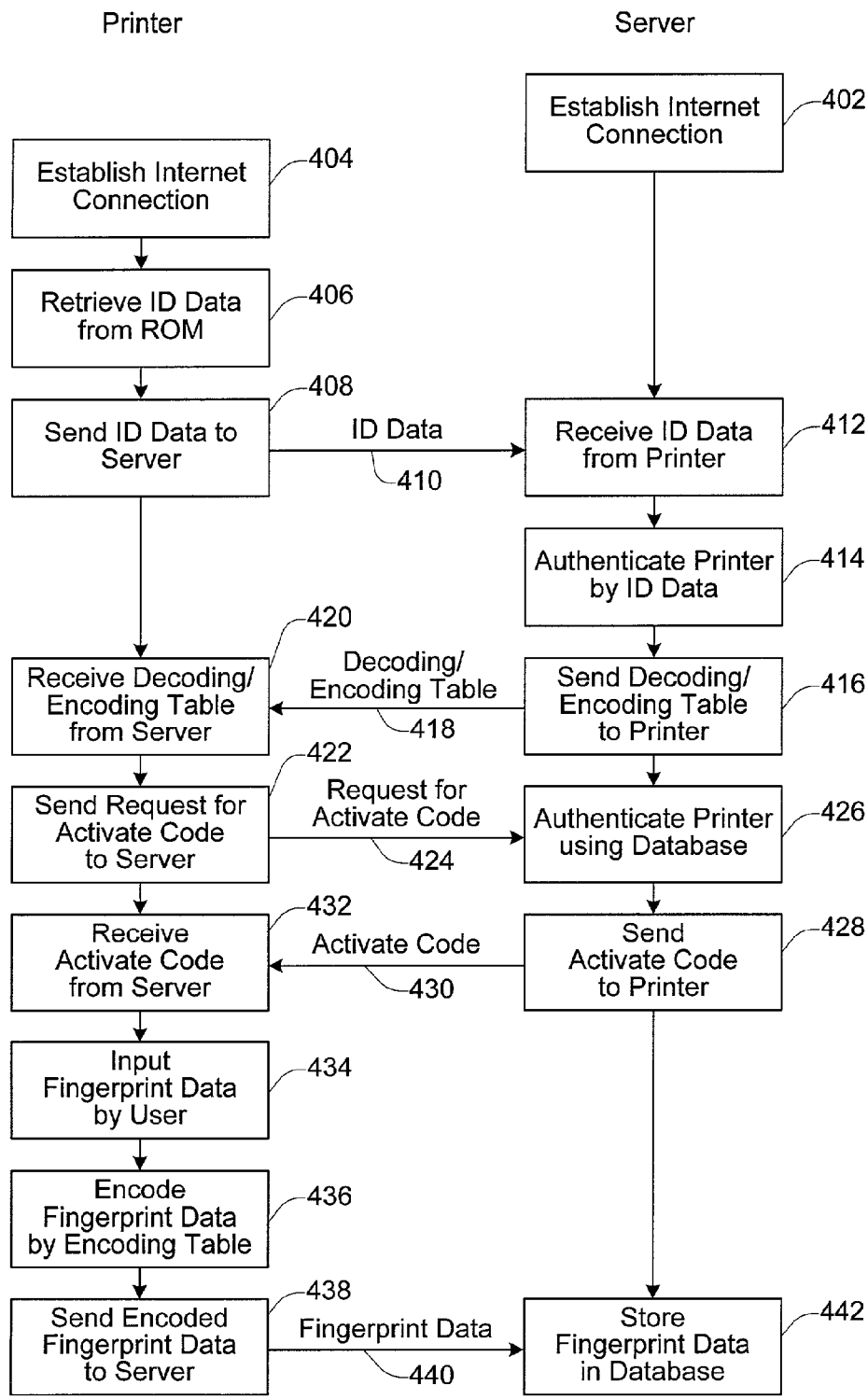
FIG. 4 is a flowchart of a specific embodiment of method for communicating between a server and a server according to the present invention.

FIG. 4 is a flowchart of a specific embodiment of method for communicating between a server and a server according to the present invention. In FIG. 4, right-hand operations and left-hand operations relate to those of the content server 120 and the printer 110, respectively. A vertical arrow and a horizontal arrow in FIG. 4 represent transition from one operation to another operation, and a data transaction between the printer 110 and the content server 120, respectively.

At 402, the content server 120 establishes a connection with the network 140. The connection may be established through an Intranet connection. At 404, the printer 110 establishes a connection with the network 140 via, for example, the servers 150 and 160. At 406, the controller 111 of the printer 110 retrieves its uniquely assigned identification data 410 associated with the printer 110 from the ROM 113. At 408, the printer 110 sends the retrieved identification data 410 to the content server 120 for authentication of the printer 110 via the network interface 112, the servers 150 and 160, and the network 140.

At 412, the processor 122 of the content server 120 receives the identification data 410 sent from the printer 110 through the network interface 126. At 414, the processor 122 matches the identification data 410 with data stored in the database 128 in order to determine whether the printer 110 is a printer authorized to print documents of value. The content server 120 may utilize an external database connected thereto for this authentication process for the printer 110. If the determination at 414 indicates that the printer 110 is authorized one, then at 416, the content server 120 sends to the printer 110 a decoding/encoding table 418 for future secured communication between the content server 120 and the printer 110. The decoding/encoding table 418 may be a single combined data table or two separate data tables, one of which is for decoding data and another of which is for encoding data. The decoding/encoding table 418 may include, for example, coefficients for polynomials used for decoding/encoding data. At 420, the printer 110 receives the decoding/encoding table 418 from the content server 120. The controller 111 stores the decoding/encoding table 418 into the EEPROM 114.

According to the present invention, the decoding/encoding table 418, which is generally referred to as the "decoding/encoding data," may take various suitable data formats depending on the algorithm used for decoding/encoding. Such a decoding/encoding table may include, for example, one or more tables containing data for decoding/encoding, or data representing algorithm (for example, polynomials or coefficients for the polynomials).

At 422, the printer 110 sends a request for an activate code 424 to the content server 120. The request for an activate code 424 is sent to the content server 120 when the user contacts the content server 120 in order to receive services (e.g., purchase and print a document of value by the printer 110). The activate code is typically service-specific. In other words, the activate code is given to the printer 110 based on the services which the user wishes to receive. Thus, the user may need two different activate codes in order to purchase and print, for example, a concert ticket and an airplane ticket.

At 426, the processor 122 determines whether the user's account for the specific services which the user requests to receive is valid based on user account data stored in the database 128. The user account data includes, for example, a user's name, a user identification code, an expiration data for the account, and the like.

The content server 120 may utilize an external database connected thereto for this authentication process for the user. If the determination at 426 indicates that the user is authorized to receive the requested services for issuing a document of value, then at 428, the content server 120 sends to the printer 110 the activate code 430 for a future service request. At 432, the printer 110 receives the activate code 430 from the content server 120. The controller 111 stores the activate code 430 into the EEPROM 114.

Operations at 404–420 may be done only when the printer 110 is installed at a user's place for the first time, and may be omitted after the authentication of the printer 110 by the content server 120. Operations at 422–432 may be done only when the user makes a request for the services for the first time, and may be omitted after the authentication of the user by the content server 120.

At 434, the printer 110 prompts the user to input fingerprint data to be set to the content server 120. Specifically, the printer 110 requests the user to put his fingertip on a scanning plane of the fingerprint scanner 115. Then, the controller 111 temporarily stores the fingerprint data in a RAM (described as a primary storage 604 later referring to FIG. 6) for data processing such as data compression, encoding, and the like. At 436, the controller 111 encodes the fingerprint data by using the encoding table for secure communication with the content server 120.

At 438, the controller 111 sends the encoded fingerprint data 440 to the content server 120 via the network interface 112, the servers 150 and 160, the network 140, and the network interface 126. At 442, the content server 120 receives the encoded fingerprint data 440 and stores the fingerprint data into the database 128 in order to check the user's identity when a request for issuance of a document of value is made in the future.

As described above, the operations 402–442 enables the content server 120 to authenticate the printer 110, authenticate the user's account who needs to receive a specific services, and register the user's fingerprint for security purposes.

Figure 5:
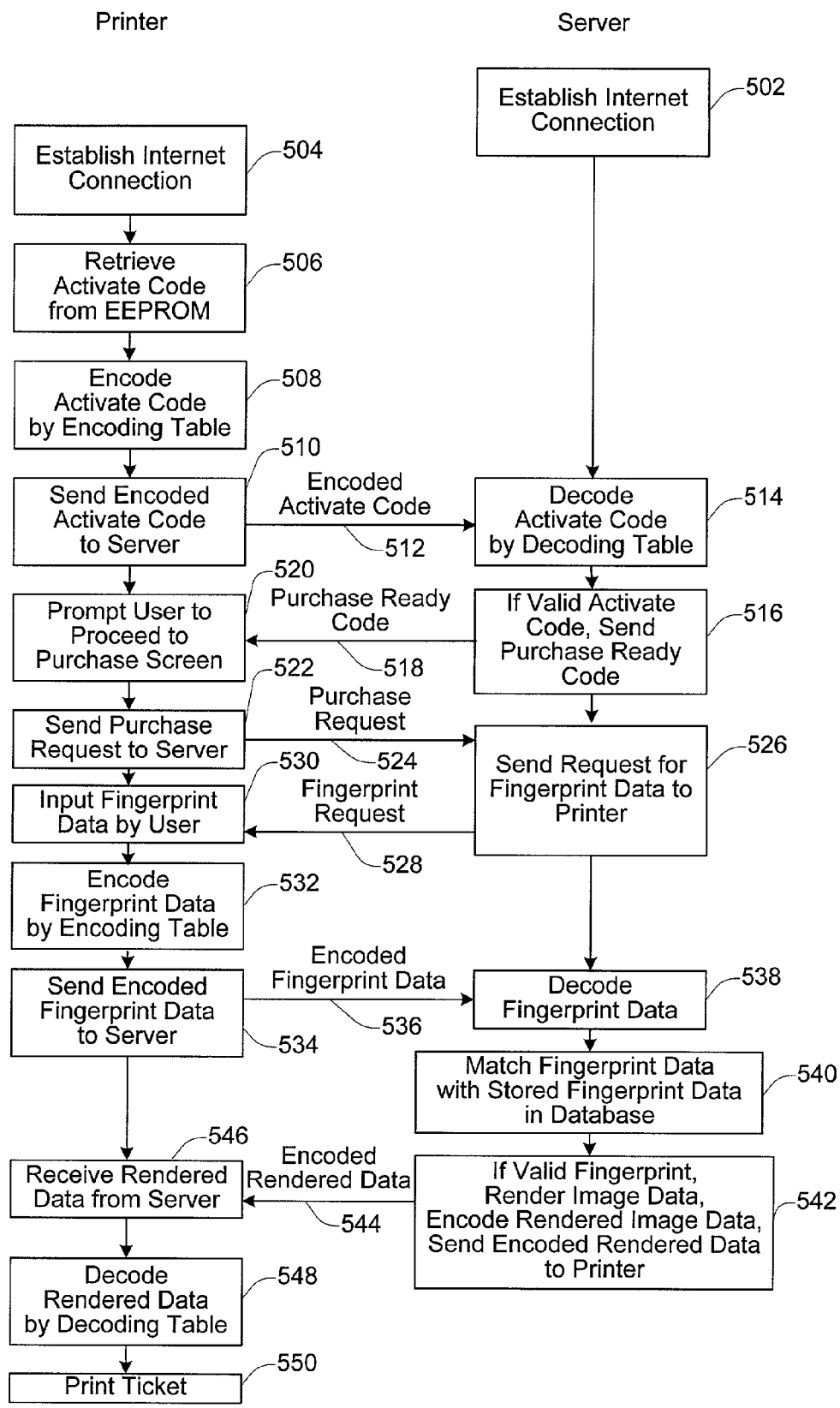
FIG. 5 is a flowchart of another specific embodiment of method for communicating between a server and a printer according to the present invention.

FIG. 5 is a flowchart of another specific embodiment of method for communicating between a server and a printer according to the present invention. In FIG. 5, right-hand operations and left-hand operations relate to those of the content server 120 and the printer 110, respectively. A vertical arrow and a horizontal arrow in FIG. 5 represent transition from one operation to another operation, and a data transaction between the printer 110 and the content server 120, respectively.

At 502, the content server 120 establishes a connection with the network 140. The connection may be established through an Intranet connection. At 504, the printer 10 establishes a connection with the network 140 via, for example, the servers 150 and 160. At 506, the controller 111 of the printer 110 retrieves the activate code 430 already assigned to the user of the printer 110 from the EEPROM 114. At 508, the processor 122 encodes the activate code 430 by using encoding data included in the decoding/encoding table 418. This encoding of the activate code 430 prevents intercepting and unauthorized copying of the activate code during transmission of the activate code 430 over the network 140. At 510, the printer 110 sends the encoded activate code 512 to the content server 120 for issuing a document of value via the network interface 112, the servers 150 and 160, and the network 140.

At 514, the processor 122 of the content server 120 receives the encoded activate code 512 sent from the printer 110 through the network interface 126, and decodes the activate code 512 by using the decoding table stored in the database 128. At 516, the processor 122 matches the decoded activate code with data stored in the database 128 in order to determine whether the user of the printer 110 has a valid account for the requested services of issuance of the document. The content server 120 may utilize an external database connected thereto for this authentication process for the user of the printer 110. If the determination at 516 indicates that the user of the printer 110 is authorized one, then the content server 120 sends to the printer 110 a purchase ready code 518 via the network 140. At 520, the printer 110 receives the purchase ready code 518 from the content server 120, and prompts the user to proceed to a purchase screen on the printer 110.

At 522, in response to the user's request to purchase and print a document of value from an input device (not shown) on the printer 110, the printer 110 sends a request for purchase 524 to the content server 120. At 526, the processor 122 sends a request for the user's fingerprint data 528 to the printer 110. At 530, the printer 110 receives the request for the user's fingerprint data 528, and prompts the user to input fingerprint data to be sent to the content server 120. Specifically, the printer 110 requests the user to put his fingertip on a scanning plane of the fingerprint scanner 115. Then, the controller 111 temporarily stores the fingerprint data in the RAM for data processing such as data compression, encoding, and the like. At 532, the controller 111 encodes the fingerprint data by using the encoding table for secure communication with the content server 120.

At 534, the controller 111 sends the encoded fingerprint data 536 to the content server 120 via the network interface 112, the servers 150 and 160, the network 140, and the network interface 126. At 538, the content server 120 receives the encoded fingerprint data 536 and decodes the encoded fingerprint data 536 by using the decoding table stored in the database 128. At 540, the processor 122 matches the decoded fingerprint data with user data stored into the database 128 in order to check the user's identity and determine whether the user's account for the specific services which the user requests to receive is valid based on user account data stored in the database 128. The content server 120 may utilize an external database connected thereto for this authentication process for the user.

If the determination at 540 indicates that the user is authorized to receive the requested services for issuing a document of value, then at 542, the processor 122 renders (or rasterizes) an image for the requested document of value by utilizing the printer driver 124, encodes the rendered image data by using the encoding table stored in the database 128, and sends the encoded rendered image data 544 to the printer 110 via the network 140. This encoding of the rendered image data prevents intercepting and unauthorized copying for forgery of the rendered image data during transmission of the activate code 430 over the network 140.

Before rendering the image, the processor 122 of the content server 120 typically "parses" image data for the request document of value stored in the database 128 (i.e., identifies its image type and its location on a printed page and performs any required rotation or scaling) and stores the parsed image data in a RAM (described as a primary storage 604 later referring to FIG. 6) for rendering age. The rendering operation at 542 may include, for example, not only superimposing different objects located at the same physical location, but also conversion of the tree primary color planes into corresponding planes for each thermal transfer ink (typically four, or even more for certain printing processes) and other image manipulation appropriate for a particular selection of inks and print medium. Thus, the rendered data generated by the content server 120 includes bit-mapped image data, and does not include code data described by a PDL (page description language), such as ESC/P, LIPS, N201, PostScript, and the like.

At 546, the printer 110 receives the encoded rendered image data 544 from the content server 120. At 548, the controller 111 of the printer 110 decodes the encoded rendered image data 544 by using decoding data included in the decoding/encoding table 418. At 550, the controller 111 prints the requested document of value (e.g., a concert ticket) by the printing mechanism 118 based on the decoded rendered image data.

It is understood that the decoding/encoding table used by the processor 122 may be stored in various devices other than the database 128. For example, the decoding/encoding table may be stored in a mass storage (referred to as 608 in FIG. 6) associated with the processor 122.

The functionality of the embodiments of the present invention can be implemented by any combination of software and/or hardware. For example, the embodiments can be implemented in an operating system (e.g., Windows NT) kernel, in a separate user process, in a library package bound into network applications, on a specially constructed machine, or on a network interface card. In one specific embodiment of the invention, the operations performed by the embodiments of the invention are partially implemented in server software. It is also partially implemented in client code on a device which is connected with the server via the network. Both components may be implemented in an operating system or in an application running on an operating system.

Embodiments of the present invention relate to an apparatus and a method for performing the above-described transmission of rendered image data. This apparatus may be specially constructed (or designed) for the required purposes, or it may be a general-purpose computer selectively activated or configured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method operations. The required architecture or structure for a variety of these machines will appear from the description given below.

Such a programmable machine may be a network device designed to handle network traffic, such as, for example, a network sever. Such network devices may have multiple network interfaces including frame relays or ISDN interfaces, for example. In an alternative embodiment, the item substitution technique of this invention may be implemented on a general-purpose network host machine such as a personal computer or workstation. Further, any or all of the functionality of the invention may be at least partially implemented on a card (e.g., an interface card) for a network device or a general-purpose computing device.

In addition, embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as mini disks, floptical disks; and hardware devices that are specially configured to store and perform program instructions, such as ROM (read-only memory) and RAM (random access memory). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 6:
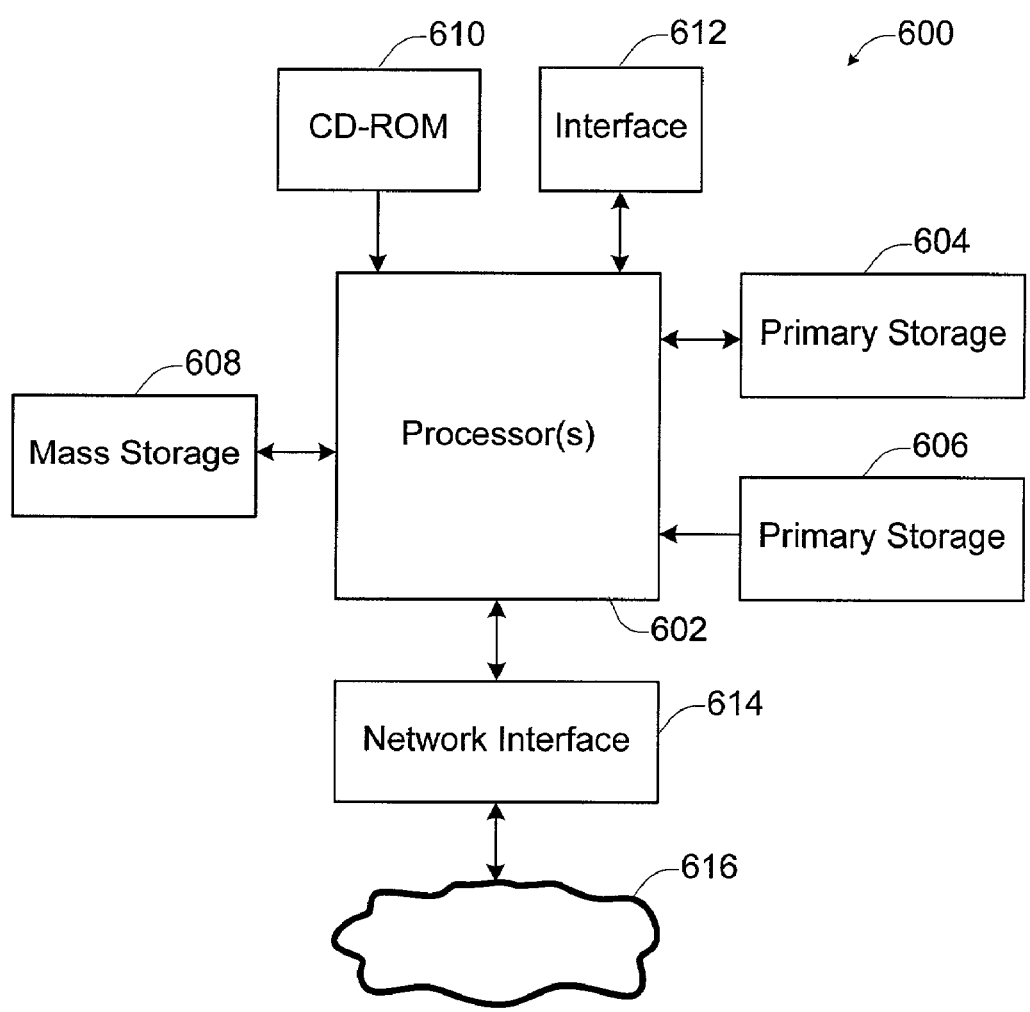
FIG. 6 is a block diagram of a typical computer system in accordance with an embodiment of the present invention.

FIG. 6 is a block diagram of a typical computer system in accordance with an embodiment of the present invention. The computer system 600 includes any number of processors 602 (also referred to as controllers, CPUs, or central processing units) that are coupled to storage devices including primary storage 604 (typically a RAM), primary storage 606 (typically a ROM). As is well known in the art, the primary storage 604 acts to transfer data and instructions bi-directionally to the CPU and primary storage 606 is used typically to transfer data and instructions in a uni-directional manner. Both of these primary storage devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 604 as virtual memory. A specific mass storage device such as a CD-ROM 610 may also pass data uni-directionally to the CPU 602.

CPU 602 is also coupled to an interface 612 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network 616 including the Internet and/or an Intranet (typically a LAN, or local area network) using a network interface as shown generally at 614. With such a network interface, it is contemplated that the CPU 602 might receive information from the network 616, or might output information to the network in the course of perform the above-described method operations. The above-described devices and materials will be familiar to those of skill in the computer hardware and software arts.

The network interface 614 is typically provided as an interface card (sometimes referred to as a "line card"). Generally, it controls the sending and receiving of data packets over the network and sometimes support other peripherals used with the computer system 600. The network interface 614 may be one of Ethernet interfaces, frame relay interfaces, cable interfaces, DSL (Digital Subscriber Line) interface, token ring interfaces, and the like. In addition, various very high-speed interfaces may be provided such as fast Ethernet interfaces, Gigabit Ethernet interfaces, AIM (Asynchronous Transfer Mode) interfaces, HSSIs (High-Speed Serial Interfaces), FDDIs (Fiber Distributed Data Interface) and the like. Generally, these interfaces may include ports appropriate for communication with the appropriate media. In some cases, they may also include an independent system including a processor and system memory.

The CPU 602 may take various forms. It may include one or more general purpose microprocessors that are selectively configured or reconfigured to implement the functions described herein. Or it may include one or more specially designed processors or microcontrollers that contain logic and/or circuitry for implementing the functions described herein. Any of the logical devices serving as CPU 602 may be designed as general purpose microprocessors, microcontrollers (sometimes simply referred to as "controller"), ASICs (application specific integrated circuits), DSPs (digital signal processors), PLDs (programmable logic devices), FPGAs (field programmable gate arrays), and the like. They may execute instructions under the control of the hardware, firmware, software, reconfigurable hardware, combinations of these, etc.

The hardware elements described above may be configured (usually temporarily) to act as one or more software modules for performing the operations of this invention. For example, separate modules may be created from program instructions for performing the functionality of the embodiments according to the present invention as described above. The components shown in FIG. 6 are coupled separately, but any or all of them may be coupled through a common system bus (e.g., a PCI bus).

Although the foregoing invention has been described in some detail for purposes of clarity of understanding it will be apparent that certain changes and modifications may be practiced within the scope of the appended claims.

What is claimed is:

1. A printer suitable for use in conjunction with a server operable to output rendered data representing an image to the printer via a network, the printer comprising:
   a storage medium operable to store identification data associated with the printer;
   a controller operable to
      send the identification data to the server,
      receive decoding data and the rendered data from the server, and
      generate decoded data by decoding the rendered data by using the decoding data; and
   a printer mechanism operable to print the image based on the decoded data.

2. The printer of claim 1, wherein the rendered data includes bit image data.

3. The printer of claim 1, wherein
   the printer is coupled to the server via a network device;
   a first IP address is assigned to the network device;
   a second IP address different from the first IP address is assigned to the printer; and
   the rendered data has the second IP address in a header portion thereof.

4. The printer of claim 1, wherein
   the printer is coupled to the server via a network device;
   a first IP address is assigned to the network device;
   a sub IP address is assigned to the printer by the network device; and
   the rendered data has the first IP address and the sub IP address in a header portion thereof.

5. The printer of claim 1, wherein the controller is operable to send a request for an activate code to the server, receive and store the activate code from the server, and send the activate code to the server when the server requests the printer to send the activate code for authentication.

6. The printer of claim 1, further comprising:
   an input unit operable to send user data unique to a user to the server for authentication in response to a request for the user data from the server.

7. The printer of clam 6, wherein the controller is further operable to receive encoding data from the server, generate encoded data by encoding the user data, and send the encoded data to the server for authentication.

8. The printer of claim 7, wherein the user data represents a fingerprint of the user, and the input unit includes a fingerprint scanner.

9. The printer of claim 7, wherein the user data represents credit card information of the user, and the input unit includes a card reader.

10. A printer suitable for use in conjunction with a server operable to output rendered data representing an image via a network, the printer comprising:
    means for storing identification data associated with the printer;
    means for sending the identification data to the server;
    means for receiving decoding data and the rendered data from the server;
    means for generating decoded data by decoding the rendered data by using the decoding data; and
    means for printing the image based on the decoded data.

11. A method for printing an image by a printer based on rendered data received from a server operable to output the rendered data representing the image to the printer, the method comprising:
    retrieving identification data associated with the printer;
    sending the identification data from the printer to the server;
    receiving decoding data and the rendered data from the server;
    generating decoded data by decoding the rendered data by using the decoding data; and
    printing the image based on the decoded data.

12. The method of claim 11, wherein the rendered data includes bit image data.

13. The method of claim 11, wherein
    the printer is coupled to the server via a network device;
    a first IP address is assigned to the network device;
    a second IP address different from the first IP address is assigned to the printer; and
    the rendered data has the second IP address in a header portion thereof.

14. The method of claim 11, wherein
    the printer is coupled to the server via a network device;
    a first IP address is assigned to the network device;
    a sub IP address is assigned to the printer by the network device; and
    the rendered data has the first IP address and the sub IP address in a header portion thereof.

15. The method of claim 11, further comprising:
sending a request for an activate code to the server;
receiving and storing the activate code from the server; and
sending the activate code to the server when the server requests the printer to send the activate code for authentication.

16. The method of claim 11, further comprising:
sending user data unique to a user to the server for authentication in response to a request for the user data from the server.

17. The method of claim 16, further comprising:
receiving encoding data from the server,
generating encoded data by encoding the user data, and
sending the encoded data to the server for authentication.

18. The method of claim 17, wherein the user data represents a fingerprint of the user.

19. The method of claim 17, wherein the user data represents credit card information of the user.

20. A computer program product for printing an image by a printer based on rendered data received from a server operable to output the rendered data representing the image, comprising:
a computer readable medium; and
computer readable code stored in the computer readable medium for causing a computer to:
store identification data associated with the printer,
send the identification data to the server,
receive decoding data and the rendered data from the server,
generate decoded data by decoding the rendered data by using the decoding data, and
print the image based on the decoded data.

21. A server suitable for use in conjunction with a printer operable to print rendered data representing an image, comprising:
a printer driver operable to generate the rendered data; and
a controller operable to
receive identification data associated with the printer from the printer,
authenticate the printer based on the identification data,
send decoding data suitable for use by the printer to decode the rendered data, and
send the rendered data to the printer.

22. The server of claim 21, wherein the rendered data includes bit image data.

23. The server of claim 21, wherein the controller is further operable to
receive a request for an activate code from the printer,
send the activate code to the printer in response to the authentication of the printer, and
send a request for the activate code to the printer when the server needs the activate code for authentication.

24. A server suitable for use in conjunction with a printer operable to print rendered data representing an image, comprising:
means for generating the rendered data;
means for receiving identification data associated with the printer from the printer;
means for authenticating the printer based on the identification data;
means for sending decoding data suitable for use by the printer to decode the rendered data; and
means for sending the rendered data to the printer.

25. A method for communicating with a printer operable to print rendered data representing an image, comprising:
generating the rendered data;
receiving identification data associated with the printer from the printer;
authenticating the printer based on the identification data;
sending decoding data suitable for use by the printer to decode the rendered data; and
sending the rendered data to the printer.

26. The method of claim 25, wherein the rendered data includes bit image data.

27. The method of claim 25, further comprising:
receiving a request for an activate code from the printer;
sending the activate code to the printer in response to the authentication of the printer; and
sending a request for the activate code to the printer when the server needs the activate code for authentication.

28. A computer program product for communicating with a printer operable to print rendered data representing an image, comprising:
a computer readable medium; and
computer readable code stored in the computer readable medium for causing a computer to:
generate the rendered data;
receive identification data associated with the printer from the printer;
authenticate the printer based on the identification data;
send decoding data suitable for use by the printer to decode the rendered data; and
send the rendered data to the printer.

29. A printer suitable for use in conjunction with a server operable to output rendered data representing an image to the printer via a network, the printer comprising:
a storage medium operable to store identification data associated with the printer;
an input unit operable to send user data unique to a user to the server for authentication in response to a request for the user data from the server;
a controller operable to
send the identification data to the server,
receive decoding data and the rendered data from the server,
generate decoded data by decoding the rendered data by using the decoding data,
send a request for an activate code to the server,
receive and store the activate code from the server,
send the activate code to the server when the server requests the printer to send the activate code for authentication,
receive encoding data from the server,
generate encoded data by encoding the user data, and
send the encoded data to the server for authentication; and
a printer mechanism operable to print the image based on the decoded data, wherein
the rendered data includes bit image data,
the printer is coupled to the server via a network device,
a first IP address is assigned to the network device,
a sub IP address is assigned to the printer by the network device, and
the rendered data has the first IP address and the sub IP address in a header portion thereof.

* * * * *